Dec. 7, 1965     S. A. PFISTER     3,221,352
DRILLING MACHINE FEED MECHANISM
Filed June 5, 1963
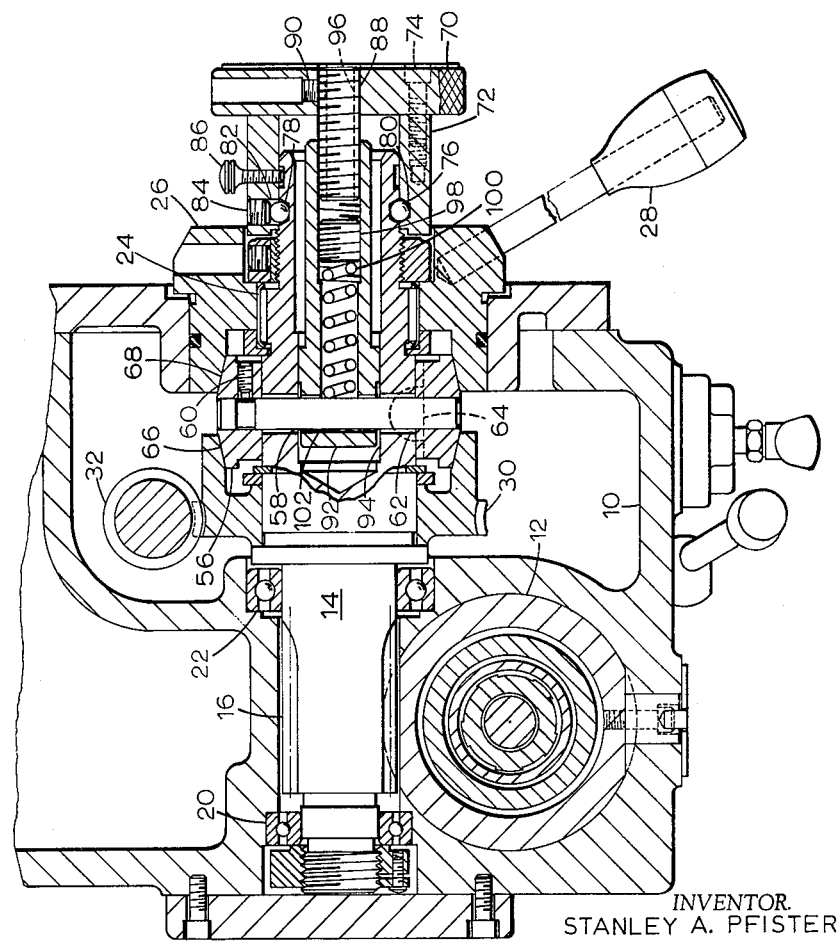
INVENTOR.
STANLEY A. PFISTER
BY
Howard J. Klaser
& Jack J. Earl
ATTORNEYS

United States Patent Office 3,221,352
Patented Dec. 7, 1965

3,221,352
DRILLING MACHINE FEED MECHANISM
Stanley A. Pfister, Wilmington, Ohio, assignor to The Cincinnati Milling Machine Co., Cincinnati, Ohio, a corporation of Ohio
Filed June 5, 1963. Ser. No. 285,704
2 Claims. (Cl. 10—139)

The present invention relates to machine tools and more particularly to a feed mechanism for the quill of a drilling machine.

Drilling machines in many cases are used to produce threads in holes as well as to drill the holes. In the threading operation, a cutting tool or tap for producing the thread is fixed in a rotatable spindle of the machine and is advanced into the workpiece at a rate corresponding to the axial advance of the tap determined by its rate of rotation and the lead of the thread which it is to cut. In performing these operations automatically, the quill of a drilling machine which carries the rotatable spindle toward and away from a workpiece is power driven up and down and therefore the power feed of the quill must be coordinated accurately with the normal advance of the tap as it turns into and out of the workpiece in conformity with its thread. Various devices have been produced which provide an axial floating action of the tap a limited amount to compensate for slight mismatches of normal tap advance and quill feed. These devices are usually in the form of tool attachments but in some cases rather complicated servo control systems have been developed. Both the attachments and servo systems are somewhat inconvenient and expensive.

It is therefore an object of this invention to provide a drilling machine with a simple and inexpensive power quill feed mechanism which can be adjusted such that the rate of feed of the tap into a workpiece will correspond to the normal feed of the tap due to its thread.

Automatic drilling machines also must have a positive power feed of the quill at a preselected rate during those times when drilling operations are performed. In addition many drilling machines are used in a variety of jobs necessitating set-up of automatic cycles and this set-up is usually done initially by the machine operator with the quill feed under manual control.

Therefore it is a further object of this invention to provide a drilling machine with a feed mechanism that can be adjusted selectively for one of three feed modes, including tapping feed, positive power feed and manual feed through the use of a common transmission mechanism which is inexpensive, compact and easily set to select one of these three modes.

In its preferred form, this invention utilizes a bidirectionally operated friction clutch member which is normally urged in one direction by a preset force to connect a motor to a drive member geared to a quill. The preset force is at a level such that torque available to move the quill is limited in accordance with the preset force and when excessive opposition to quill feed is encountered the clutch slips. The clutch member also is movable selectively in the same direction for engagement in a manner such that a positive forceful engagement is attained and all of the torque available from the power source is transmitted to the quill for movement of it. The clutch member is movable in the other direction to connect a manually operated member to the quill and to completely disconnect the power source.

A clear understanding of this invention can be obtained from the following detailed description in which reference is made to the attached drawings wherein:

FIG. 1 is a sectional view of a drilling head taken on a plane through the head perpendicular to the direction of movement of the quill and to the axis of rotation of the spindle carried therein.

FIG. 2 is a partial section of the drilling head of FIG. 1 on line 2—2 showing a simplified feed motor power source for connection to the quill.

The mechanism shown in FIGS. 1 and 2 includes a drill head housing 10 in which a quill 12 is slidably received for movement to extend it from and to retract it into the housing 10. Movement of the quill 12 is produced by rotation of a member 14 having a pinion 16 formed thereon and engaged with a toothed rack 18 formed along one side of the quill 12. The member 14 is received for rotation in a pair of ball bearings 20, 22 received in the housing 10 and a needle bearing 24 which is received in a bushing 26 that in turn is rotatably journalled through a side of the housing 10. A control handle 28 is fixed to and extends from the bushing 26 to provide convenient means to rotate the bushing 26 manually. A worm wheel 30 is also rotatably received over the drive member 14 and it is engaged by a worm 32, FIG. 2, which is driven by a motor 34. The transmission of the motor drive to the worm 32 is simplified for purposes of this description and is shown as a direct coupling, but in actual practice a gear transmission or equivalent mechanism is included between the motor 34 and worm 32 to provide for connection and disconnection of the motor 34 from the worm 32. Mechanisms of this type are old and very well known in the art and a detailed description and showing of the gears is not included herein. The motor 34 in the described embodiment is a reversibly operable and variable speed hydraulic motor.

As shown, a spindle 36 is rotatably supported in the quill 12 by means of bearings 38, 40 received in the quill and maintained in spaced relation therein by a sleeve 42, a pair of spacers 44, 46 and a nut 48. The spindle 36 is rotated in the quill 12 by a drive train mechanism which terminates as a rotating spline shaft 50 which is slidably engaged in the spindle 36 in a telescoping manner such that the rotation of the spline shaft 50 is transmitted to the spindle 36 while the quill 12 is moved in and out of the housing 10. The exposed end of the spindle 36 has a tapered tool receiving surface 52 in which drills, taps and other tools are received for rotation by the spindle 36 and movement by the quill 12. As shown, a tapping tool 51 is received in the spindle 36 for movement into and out of a workpiece 53 during a tapping operation. A tool ejector rod 54 is slidably received through the spindle to force tools out of the tapered receiving surface 52 after they have been used.

The drive member 14 is rotatable by the motor 34 in one of two modes of operation and is rotatable with the bushing 26 in a third mode. The mode of operation is determined by the position of a cone clutch member 56 that is received over the member 14 and fixed to a shaft 58 by a set screw 60. The shaft 58 is received through a slightly oversized opening 62 that extends transversely through the drive member 14. The clutch member 56 is movable axially along the member 14 with the shaft 58 a limited amount due to the oversizing of the opening 62. The clutch member 56 is rendered rotatable with the drive member 14 by a key 64 received therebetween and circumferentially spaced from the opening 62, the key 64 being shown slightly out of position in FIG. 1. The clutch member 56 and the worm wheel 30 have a pair of mating surfaces 66 which coact to form a driving connection in train between the motor 34 and the drive member 14 when forced together. The clutch member 56 and bushing 26 also have a pair of mating surfaces 68 which coact to form a driving connection in train between the bushing 26 and the drive member 14 when forced together.

A control knob 70 is provided to set the mode of operation which determines the condition of engagement between one or the other of the pairs of mating surfaces 66 and 68. The knob 70 is fixed to a sleeve 72 by screws 74 and the sleeve 72 in turn is received around the member 14 and maintained rotatably thereon by balls 76 embraced between opposed tracks 78, 80, the balls 76 being inserted into the space between the tracks 78, 80 through a hole 82 plugged by a screw 84. The knob 70 and sleeve 72 may be locked with respect to the member 14 by a screw 86 threaded through the sleeve 72 and adapted to engage the member 14. A threaded stud 88 is secured in the knob 70 by a screw 90 and it is threaded into the end of a member 92 which is received for axial movement in and out of a bore 94 in the drive member 14. The stud 88 has an opening 96 axially therethrough to provide access to a screw 98 threaded into the member 92 beyond the end of the stud 88. The screw 98 furnishes the means to adjust the compression of a spring 100 received in the member 92 between the screw 98 and the shaft 58 which passes loosely through a transverse opening 102 in the member 92. The spring normally moves the shaft 58 and clutch member 56 such that the mating surfaces 66 are held together with a preset force dependent upon the compression of the spring 100 by the screw 98. This force is set such that slippage occurs between the turfaces 66 at a predetermined level of torque transmission therebetween and the power feed of the quill 12 is stopped or slowed appreciably due to the slippage when the quill 12 encounters substantial resistance to feed requiring a torque greater than the preset level to overcome it, as when during a tapping operation, the power feed rate is in excess of the normal advance of the tap 51 into the workpiece 53. It has been found that tapping of holes can be performed with the mechanism described while the quill feed rate is set at rapid advance and retract to move the quill directly into engagement with and away from the workpiece without a slowing of the quill except through slippage in the clutch during actual contact of the tap and workpiece. This is the mode of operation that occurs when the knob 70 is in its center position to hold the member 92 out of engagement with the shaft 58 at the opening 102 since, by the threaded engagement with the stud 88, the axial position of the member 92 is determined by the angular position of the knob 70.

The knob 70 can be rotated counterclockwise, as viewed from the right of FIG. 1, from its center position to cause the member 92 to shift leftward. This carries the clutch member 56 leftward for positive forceful engagement between the surfaces 66 and for transmission of the full torque available at the motor 34 to the quill 12 for power feed of the quill 12 during drilling operations. The engagement between the surfaces 66 at the time of power feed is much more forceful than when the knob 70 is set at its center position for tapping. Rotation of the knob 70 from the center position in the clockwise direction, as viewed from the right of FIG. 1, will move the clutch mechanism to its manual control condition since the member 92 is then moved rightward and the shaft 58 is engaged to carry the clutch member 56 rightward with the member 92. The surfaces 68 are then positively engaged while the surfaces 66 are very slightly separated so that no power is transmitted from the motor 34 to the quill 12. The quill 12 can be shifted only by rotation of the bushing 26 under manual control when the knob 70 is rotated to a position clockwise from the center position.

While the invention has been described with reference to one possible form or embodiment thereof, it is to be understood that the present disclosure is illustrative rather than restrictive and that changes and modifications may be resorted to without departing from the spirit of the invention or the scope of the claims which follow.

What is claimed is:

1. In a drilling machine having a head, a quill therein and a source of power and a manual control member both for reciprocally moving the quill in and out of the head, a transmission mechanism selectively to connect the quill to the power source and manual control member one at a time comprising:
   (a) a drive member connected to the quill for movement thereof when said drive member is rotated,
   (b) a friction clutch including
      (1) a first set of mating friction drive surfaces in train between the power source and said drive member, and
      (2) a second set of mating friction drive surfaces in train between the manual control member and said drive member,
   (c) bias means tending to hold said first set of surfaces in contact with a predetermined pressure for transmission of a corresponding maximum torque therebetween and including
      (1) means to adjust said bias means to alter said predetermined pressure, and
   (d) engaging means selectively movable in one direction from a neutral position thereof to hold said first set of surfaces together positively for transmission of a torque therebetween greater than the maximum torque corresponding to said predetermined pressure and movable from the neutral position in the other direction to positively engage said second set of surfaces and to disengage said first set of surfaces to provide rotation of said drive member only in accordance with movement of the manual control member.

2. The mechanism of claim 1 in which
   (a) said friction clutch is a cone clutch having
      (1) a single shiftable member received on said drive member for axial movement therealong and for rotation therewith,
      (2) a first rotatable member connectable for rotation by said power source,
      (3) a second rotatable member attached to said manual control member,
      (4) said first and second rotatable members being loosely received around said drive member on opposite sides of said shiftable member,
   (b) said first and second sets of mating surfaces are between said shiftable member and said first and second rotatable members respectively, and
   (c) said bias means and said engaging means operate to axially move said shiftable member.

References Cited by the Examiner
UNITED STATES PATENTS 465,892 12/1891 Smith _____ 74—625
1,780,083 10/1930 Kingsbury _____ 77—33.3

FOREIGN PATENTS 238,788 8/1925 Great Britain.
301,483 6/1929 Great Britain.

ANDREW R. JUHASZ, Primary Examiner.